United States Patent [19]

Pavlow et al.

[11] 4,343,603
[45] Aug. 10, 1982

[54] MACHINE FOR ENCAPSULATING FOOD IN DOUGH

[75] Inventors: Roger Pavlow, 1560 Fourth St., San Rafael, Calif. 94901; Herman E. Frentzel, Kentfield, Calif.

[73] Assignee: Roger Pavlow, San Rafael, Calif.

[21] Appl. No.: 170,312

[22] Filed: Jul. 16, 1980

[51] Int. Cl.³ .................... A21C 3/04; A23L 1/10; A23L 1/31

[52] U.S. Cl. .................... 425/114; 83/371; 99/353; 118/15; 118/24; 118/41; 221/236; 425/142; 425/308; 425/377; 425/463

[58] Field of Search .................... 264/148, 149, 172; 425/114, 123, 126 R, 96, 97, 106, 127, 129 R, 377, 308, 142, 113, 463, 311, 377; 17/33-35, 1 F; 426/89, 94, 302, 516, 92, 105, 138, 140, 107; 83/371; 99/426, 430, 431, 441, 450.1, 353, 352; 118/13, 15, 24, 25, 41, 668, 676

[56] References Cited

U.S. PATENT DOCUMENTS

| | | | |
|---|---|---|---|
| 862,475 | 8/1907 | Haywood | 264/149 |
| 1,654,871 | 1/1928 | Gage et al. | 17/33 |
| 2,452,607 | 11/1948 | Slaughter | 425/114 |
| 2,467,642 | 4/1949 | Wilson et al. | 264/172 |
| 2,561,569 | 7/1951 | Flynn | 264/172 |
| 2,575,138 | 11/1951 | Slaughter | 264/150 |
| 2,602,558 | 7/1952 | Clark | 198/733 |
| 2,657,431 | 11/1953 | Slaughter | 264/172 |
| 2,676,354 | 4/1954 | Mosby | 17/1 F |
| 3,016,167 | 1/1962 | Richards et al. | 221/266 |
| 3,071,065 | 1/1963 | Macy et al. | 99/443 C |
| 3,156,006 | 11/1964 | Gouba | 17/1 F |
| 3,676,158 | 7/1972 | Fischer et al. | 426/94 |
| 3,765,811 | 10/1973 | Sawada | 425/142 |
| 3,767,821 | 10/1973 | Deacon et al. | 426/302 |
| 3,808,636 | 5/1974 | Gouba | 17/34 |
| 4,098,179 | 7/1978 | Fleishaker et al. | 99/353 |

*Primary Examiner*—Willard E. Hoag
*Attorney, Agent, or Firm*—Townsend and Townsend

[57] ABSTRACT

A machine for extruding dough, typically of the bagel variety, about a food, such as a frankfurter, is disclosed. Typically, the frankfurters are loaded into a magazine. The magazine feeds a star wheel at the bottom. The star wheel singulates, rotates and discharges the frankfurters into a chute. Once the frankfurters are deposited in the chute, an endless chain with propelling pawls propels each sequential frankfurter through the chute concentrically to an extruder. The extruder continuously dispenses bagel dough concentrically around the frankfurters and is supplied with bagel dough under pressure by an auger flight extruder or other propelling mechanism. Extrusion occurs from an extrusion head having a frankfurter passageway centrally thereof. Dough is extruded into first and second extrusion chambers and out first and second immediately concentric extrusion annuluses about the frankfurter passageway. The dough encased frankfurter passes from the chamber onto a conveyor belt and under a sensing roller and a downstream knife.

The sensing roller is separated from the knife by the spatial interval equal to about the length of a dough encased frankfurter. By sensing the interruption in the dough marked by the absence of a frankfurter, actuation of the knife occurs, severing sequential bagel dog products one from another so that discharge of the complete and severed dough encased frankfurter at the end of the line occurs.

5 Claims, 4 Drawing Figures

U.S. Patent   Aug. 10, 1982   Sheet 1 of 2   4,343,603
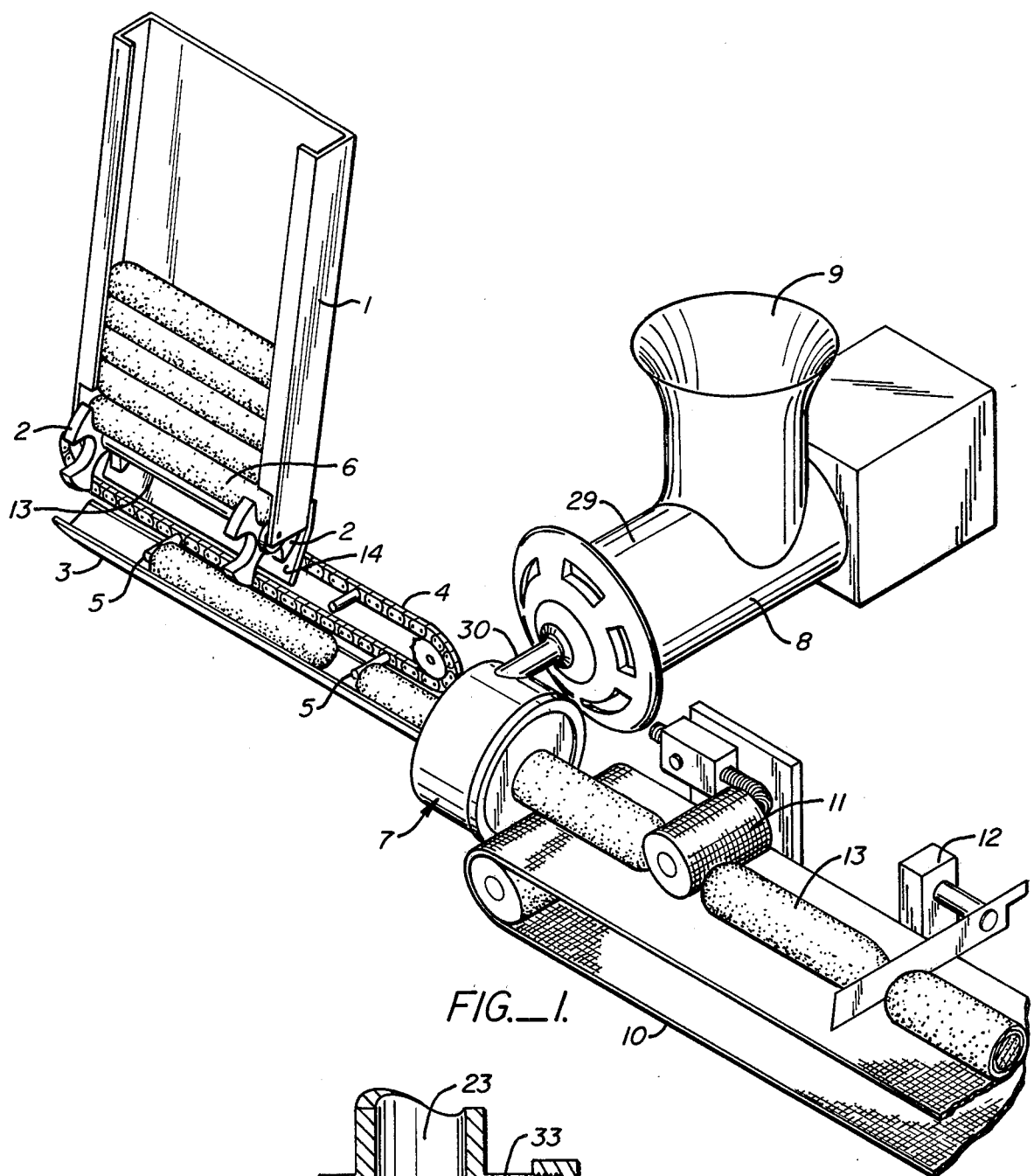
FIG._1.
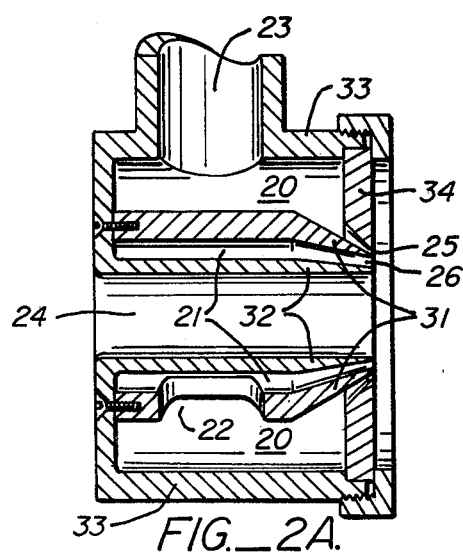
FIG._2A.

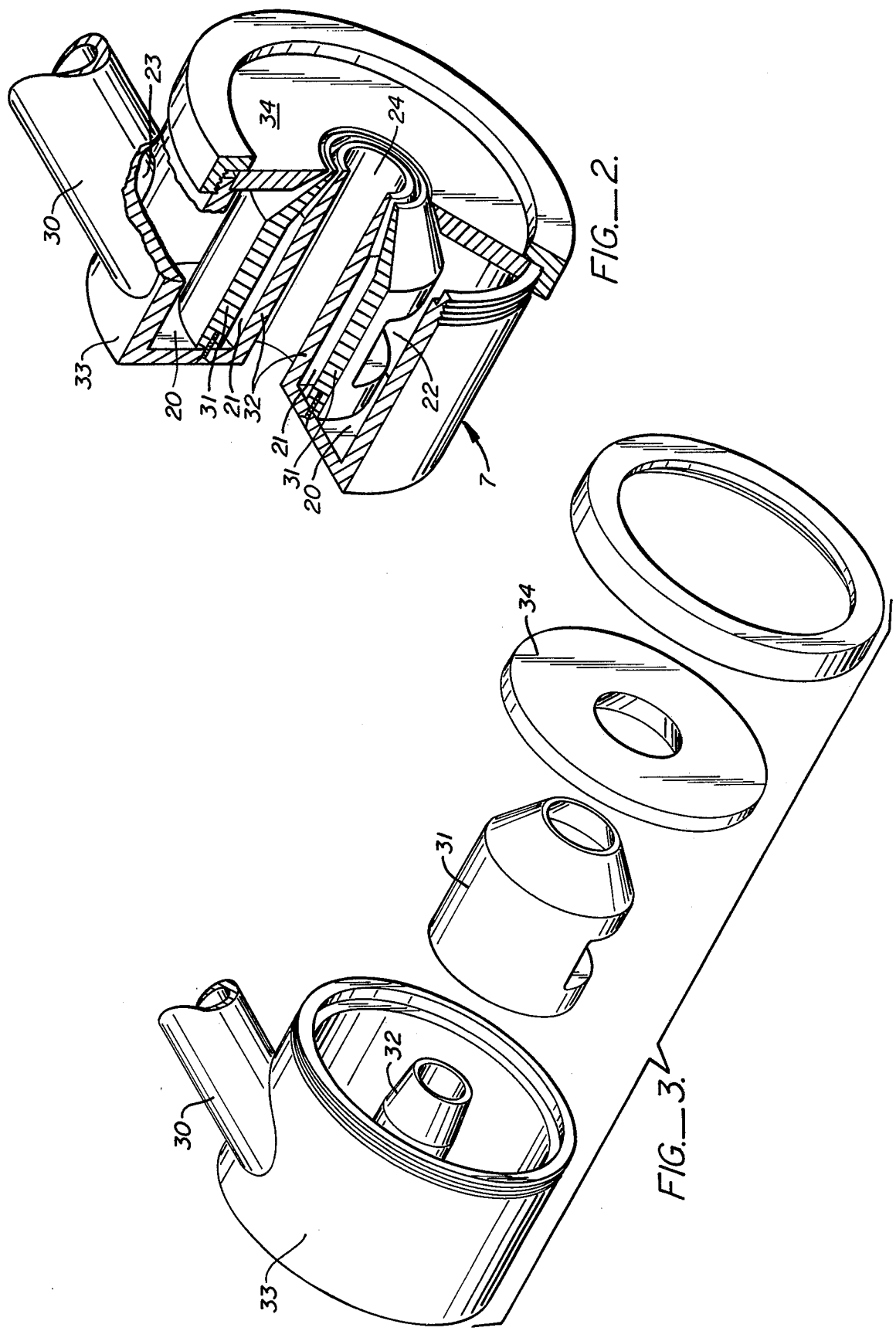

MACHINE FOR ENCAPSULATING FOOD IN DOUGH

This patent application relates to frankfurters and specifically illustrates a new and improved machine for encasing frankfurters in dough.

SUMMARY OF THE PRIOR ART

The encasement of frankfurters or hot dogs in dough material for cooking purposes is known. Placing bagel dough around a hot dog or frankfurter prior to cooking has heretofore not been accomplished other than by hand processes.

In hand processes, dough is typically folded around a frankfurter.

Typically, and in the prior art, it has been known to extrude meat centrally of a bakery product, and to extrude the dough concentrically about and around the inner extruded meat product. In such machines, the meat product has been ground and extruded. The dough therefore is about ground meat and not an encased frankfurter.

We have found that seams about a bakery product where a dough encases an inner meat filling are to be avoided. Specifically, such seams are subject to rapid opening upon cooking of such products. We believe that this effect is the direct result of the kneading of the dough. Specifically, we believe that the extrusion of the dough disturbs the yeast in the encasing bread product and weakens the dough. Upon cooking the dough is much more likely to expand in the vicinity of the seam, causing the seam to open.

SUMMARY OF THE INVENTION

A machine for extruding dough, typically of the bagel variety, about a frankfurter or other food product, is disclosed. Typically, the frankfurters are loaded into a magazine. The magazine feeds a star wheel at the bottom. The star wheel singulates, rotates and discharges the frankfurters into a chute. Once the frankfurters are deposited in the chute, an endless chain with propelling pawls propels each sequential frankfurter through the chute concentrically to an extruder. The extruder continuously dispenses bagel dough frankfurters and is supplied with bagel dough under pressure by auger flight extruder or equivalent device. Extrusion occurs from an extrusion head having a frankfurter passageway centrally thereof. Dough is extruded into first and second extrusion chambers and out first and second immediately concentric extrusion annuluses about the frankfurter passageway. Respective dough entrance ports to the extrusion chambers are on diametrically opposed portions of the frankfurter passageway so that two layers of dough are extruded about the bagel dog with two seams, each seam being in its own separate dough layer on diametrically different and preferably opposite portions of the frankfurter. The dough encased frankfurter passes from the passageway onto a conveyor belt and under a sensing roller and downstream knife. The sensing roller is separated from the knife by the spatial interval about equal to the length of a dough encased frankfurter. By sensing the interruption in the dough marked by the absence of a frankfurter, actuation of the knife occurs, severing sequential bagel dog products one from another so that discharge of the complete and severed dough encased frankfurter at the end of the line occurs.

OTHER OBJECTS, FEATURES AND ADVANTAGES

It is an object of this invention to provide a machine capable of extruding dough concentrically about a frankfurter. According to this aspect of our invention, a frankfurter is registered to a concentric dough extruder. The extruder consists of an entry port along one of the walls thereof, a sealed chamber and a continuous circular and uninterrupted dough exit port. The dough exit port is concentric about on the trailing edge of an aperture through the extruder along which the frankfurter passes. By urging a frankfurter through the port and extruding dough continuously about the frankfurter, a dough-encased hot dog results.

An advantage of our invention is that the extruding head itself includes no moving parts. Consequently, simplicity of operation and machine parts is obtained. Bakery shop cleaning is greatly facilitated.

A further advantage of our invention is that we now can encase a meat product with dough by machine without remasticating or grinding the meat product. Accordingly, and in our dough-encased meat product, a recognizable and undisturbed hot dog is contained therein. Improved consumer acceptance results.

A further object of our invention is to form a dough product having a double seam. Specifically, we have found that seams in the dough about a product such as a bagel-dough-encased frankfurter dog tend to open upon baking. This is because the kneaded dough undergoes rapid expansion upon baking. To prevent this from occuring and according to our invention, we include first and second concentric extrusion chambers and apertures about a central passageway for passing frankfurters. The first chamber has a dough entrance on one side thereof and typically extrudes through a continuous and concentric aperture. This first chamber forms a seam of extrusion at the extrusion aperture opposite the dough entrance port.

To and about this first dough extrusion chamber, we form a second dough extrusion chamber. This second dough extrusion chamber can communicate to the first dough extrusion chamber. The dough receiving opening of the second chamber is placed opposite to the dough receiving opening of the first chamber. The seam from the concentric dough extrusion aperture of the second chamber is formed opposite to the port for receiving the dough. By placing the dough entrance port of the second chamber diametrically opposite to the dough entrance port of the first chamber, the seam of the second and outer dough layer is diametrically opposite from the seam of the first dough layer. There consequently results a dough-encased product in which first and second seams are formed in first and second dough layers, these seams being placed in non-aligned relationship and, preferably, on diametrically opposite portions of the product.

An advantage of our produced product is that it is particularly resistive to opening of the seams upon cooking. Taking the specific example of bagel dough, this cooking typically occurs by first boiling of the dough-encased product, and, thereafter, baking of the dough-encased product.

A further object of this invention is to disclose a machine for encasing hot dogs in dough, typically bagel dough. According to this aspect of our invention, hot dogs are first placed within a magazine and then individually dispensed to a trough by a star wheel drive.

Once deposit occurs in the trough, an endless chain with at least one pawl thereon, individually propels dogs along the trough to and through a dough extrusion path. A concentric extrusion member extrudes dough about the frankfurter or hot dog as it passes concentrically through the extrusion path. Preferably, first and second extrusion chambers with first and second diametrically opposite openings continuously extrude first and second layers of dough about the dogs. Upon exit of the extrusion chamber with the dough extruded thereabout, a sensing roller feels the beginning and ends of dogs within the dough. Upon sensing the absence of a dog, a downstream knife is actuated. This knife severs the dough between sequential dog products. Serial and singulated dough products pass out of the machine.

A further object of our invention is to disclose an improved bagel dog product. According to this aspect of our invention, a bagel dog is disclosed which has first and second layers extruded thereover. The first layer is extruded with the seam on one diametric portion of the hot dog. The second layer is extruded over the hot dog with the seam on an opposite diametric portion of the hot dog.

An advantage of our hot dog product is that seam splitting upon baking is reduced.

It will be apparent to the reader that we have used for preferred purposes the illustration of a frankfurter being encased in dough. It will be apparent that other food products may be encased as well. By way of example it should be realized that elongate food products having similar shapes to a frankfurter may just as well be encased. Examples of food products to be encased include skinless frankfurters, casing encased frankfurters, various vegetable products, including for example carrots, or even confectionary items, such as candies.

We prefer to extrude bagel dough. It should be just as apparent that other types of dough may as well be extruded. Even further, substances other than bagel dough may be extruded around an inner and central encased food product. Thus when we use the word "dough", it is to be construed broadly to include any food substance which is capable of extrusion about another food substance in the manner herein illustrated.

Other objects, features, and advantages of our invention will become more apparent after referring to the following specifications and drawings in which:

FIG. 1 is a perspective view of the dough encasing frankfurter machine of our invention illustrating, from left to right, the frankfurter dispensing magazine, the concentric dough extruding chamber, the exit of dough-encased frankfurters from the dough extruding and encasing chamber, and the sensing and severing of the sequentially dispensed dough encased frankfurters as they pass sequentially on a belt from our extruding machine;

FIG. 2 is a detail illustrating the extrusion chambers of our invention, with portions thereof being cut away to illustrate the inner and outer extrusion chambers together with the diametrically opposite dough receiving ports;

FIG. 2A is a cross-sectional drawing of the extrusion head; and,

FIG. 3 is an exploded view of the concentric dough extruding head of our invention illustrating the discrete parts thereof in disassembled format, so that cleaning is greatly facilitated.

OVERVIEW OF A COMPLETE MACHINE

FIG. 1 is a drawing of the complete system as it would appear in operation. The machine basically consists of a frankfurter dispensing assembly, a dough extrusion assembly and a dough severing assembly. The left third of the drawing shows a magazine 1 where uncoated frankfurters are initially placed, a star wheel arrangement 2 which singulates, rotates and drops frankfurters into a chute 3 and an endless chain 4 with protruding pawls 5 which propel a frankfurter 6 to a dough extrusion head 7. The center portion shows an auger flight extruder 8 which forces dough into an extrusion head 7, the opening 9 where dough is initially placed and an extrusion head 7. The right third shows a conveyor belt 10 where dough covered frankfurters are deposited, a sensing roller 11 which determines when there is a space between frankfurters in the dough and a downstream knife 12 which cuts the dough to separate the dough covered frankfurters into separate bagel dogs. Bagel dogs are removed from the conveyor belt downstream either automatically or manually.

DETAILED STRUCTURAL DESCRIPTION

The frankfurter storage, singulator, chute and propulsion portions are described with references to FIG. 1.

The storage magazine 1 is composed of two U-shaped channels and a back support piece. The channels open towards each other and are separated by a distance slightly larger than the length of a frankfurter. The back consists of either a solid panel or slats which constrains the frankfurters to move in the channels. Loading of the magazine is done from the top. Frankfurters are placed into the magazine side by side, one on top of another. The magazine is nearly vertical because the machine uses gravity to feed the frankfurters into the chute.

The singulator is comprised of two star wheels 2, a shaft connecting the two 13, a drive chain (not shown) and slides 14. The star wheels are separated by a distance slightly shorter than the length of a frankfurter, so that the frankfurter will be supported between the two star wheels. The drive chain rotates the rigid star wheel and shaft assembly continuously. As a frankfurter receiving slot rotates under the magazine the bottom frankfurter drops into the slots. As the gears rotate the frankfurter towards the back of the machine, the frankfurter is prevented from falling out as it is held in place by the two slides 14 and the two star wheels 2. The slides stop next to the chute 3, the frankfurter dropping off of them and into the chute.

The chute is located beneath the star wheels and next to the end of the slides 14. The chute is concentric to the extrusion head 7 so that the frankfurter may be pushed along the chute and directly into the dough extrusion head.

The propulsion portion consists of an endless chain 4 with propelling pawls 5 which push the frankfurters along the chute 3. The chain is located next to the chute and is situated so that the pawls are immediately above the chute 3. The pawls are close enough to the chute and extend far enough across the chute to push the frankfurter from behind. The belt and pawl system runs nearly the complete length of the chute, at least so far that it pushes the leading edge of a frankfurter out of the downstream side of the extrusion head. Once the frankfurter is that far it can be pulled through by the conveyor belt 10 pulling on the dough and pushed through by the dough being extruded around the frankfurter.

The endless chain and pawls move at such a rate so as to have moved the frankfurter far enough along the chute so that the next frankfurter will not drop on it. The next pawl on the chain is spaced so that the next frankfurter is slightly behind the previous one.

Dough extrusion involves the auger flight extruder 8 and the dough extrusion head 7. The description is made with reference to FIGS. 1, 2, 2A and 3.

A standard auger flight extruder is employed. Other types of dough propelling mechanisms may as well be used. The screw extruder used herewith includes an opening 9 where the dough is initially placed and a screw which forces the dough into extrusion head 7. Pipe 30 provides a path for the dough from the auger flight extruder to the extrusion head. Pipe 30 is disconnectable from the auger flight extruder.

The dough extrusion head 7 is described with reference to FIGS. 2, 2A and 3. The open spaces in the extrusion head are the main dough entry port 23, the outer chamber 20, the inner wall port 22, the inner chamber 21 and the central passageway 24.

Referring to FIGS. 1 and 3, the attachment of the extruding head is specifically illustrated. Typically, and with reference to FIG. 1, a threaded pipe 30 fits to and is received by the standard screw extruder. Passage of the dough to pipe 30 occurs. On exiting pipe 30, the dough then passes into the chambers defined by the apparatus shown in the exploded view of FIG. 3. It will be realized that the exploded view of FIG. 3 not only serves to illustrate the individual configurations of each of the sections of the extruder, but additionally shows their assembly sequence. In illustrating this sequence, it will be apparent that all pieces are removable to facilitate required cleaning for sanitation purposes.

Discussion of the assembled configuration with respect to FIG. 2 will set forth the overall configuration of the unit.

The outer extrusion chamber 20 is essentially annular in shape. It is formed by the outer wall 33, the inner wall 31, the back wall which is part of 33 and the end plate 34. The sole entry port 23 is that formed by the intersection of the pipe 30 and the outer wall 33. Dough enters through this port. The outer chamber has two exit ports. The first is the inner wall port 22 which is an opening in the inner wall 31. It is through this port that dough enters the inner chamber. It should be noted that area 22 in FIG. 2 is not a cutaway drawing and is actually an opening in the inner wall 31. The second exit port is the outer chamber front extrusion port 25. This exit port is formed by the opening in the end plate 34 and the outer surface of the inner wall 31. When viewed from a point in the inner chamber this exit port looks like a continuous, uninterrupted, thin, round ring slightly larger in diameter than a frankfurter.

The inner extrusion chamber 21 is essentially annular in shape. It is formed by the inner part of the inner wall 31, the outer part of the central passageway 32 and the back wall which is a continuation of the outer wall 33. The sole entry port is 22, that being a port directly through the inner wall 31. The inner chamber has a single exit port 26. This exit port is at the extreme right hand face of the extrusion head and is formed by the inner surface of the inner wall 31 and the outer surface of the central passageway 32. When viewed from a point in the inner chamber 21, the exit port 26 looks like a continuous, uninterrupted, round ring slightly larger in diameter than the frankfurter and slightly smaller in diameter than the outer chamber front extrusion port.

The central passageway 24 is essentially cylindrical in shape. The passageway is permanently attached to the back wall which is a continuation of the outer wall 33. The interior of the passageway 24 is large enough in diameter to allow the frankfurter to slide through.

A seam will form in the dough extruded from the inner chamber front extrusion port 26 at a point diametrically opposed to the inner wall port 22. A seam will likewise form in the dough extruded from the outer chamber front extrusion port 25 at a point diametrically opposed to the main dough entry port 23. The seams in the inner and outer layers of dough will not overlap as long as the dough entry ports are not oriented in the same direction. Any angular displacement large enough to prevent seam overlap and exposure of the bare frankfurter upon cooking will be sufficient. By placing the entry ports in opposite directions, as shown in FIG. 2, the problem of dough casing splitting is reduced to a minimum.

The conveyor belt, sensing roller and knife portions are described with reference to FIG. 1.

The conveyor belt 10 starts next to the extrusion head and is slightly below the lowest portion of the frankfurter passageway 24. The conveyor belt 10 moves at about the same speed as the chain and pawl assembly on the other side and thus pulls the frankfurter through the extrusion head 7 by pulling the dough.

The sensing roller 11 determines when there is no frankfurter in the double tube of dough. The roller is constrained to move at least vertically. When a dough covered frankfurter is between the roller and the conveyor belt 10, the roller is in the up position. When the tail end of the frankfurter passes beyond the roller, the roller moves closer to the conveyor belt because there is no frankfurter to support the roller. When the roller drops, it actuates the downstream knife 12.

The downstream knife 12 moves down to the conveyor belt to sever the dough between the previously connected dough covered frankfurters. The sensing roller is separated from the downstream knife by a spatial interval equal to about the length of one dough encased frankfurter.

DETAILED OPERATIONAL DESCRIPTION

Frankfurters are stacked one on top of the other in the vertical magazine 1. When a slot in the star wheels 2 rotate beneath the magazine, the bottom frankfurter in the magazine drops into the slots. As the wheels continue to rotate towards the back of the machine, the frankfurter is held in place between the star wheels 2 and the two slides 14 thus preventing the frankfurter from falling out. The frankfurter drops into the chute 3 as the star wheels push it off the end of the slides.

Once the frankfurter is in the horizontal chute 3, one of the protruding pawls 5 attached to the endless chain 4 pushes it along the chute and into the dough extruder 7. The star wheels and the chain-pawl drive are synchronized so that the previous frankfurter is pushed out of the way before the next frankfurter drops into the chute.

An uncoated frankfurter enters extrusion head 7 on the left side and exits on the right surrounded by two layers of dough. To trace the path of the dough, reference is first made to FIG. 1. The dough is initially placed in the opening 9 to the auger flight extruder 8. The auger flight extruder forces the dough through the connecting pipe 30 and into the extrusion head 7. Referring to FIG. 2, the dough enters the outer extrusion chamber 20 via port 23. The dough flows around the inner wall 31 and is forced toward the exit port. There are two exit ports for the dough. Some of the dough is forced into the inner chamber 21 through the inner wall port 22. The rest of the dough is forced out of the continuous and uninterrupted front extrusion port 25 on the right hand face of the extrusion head. Dough is continuously extruded from this exit port.

The dough that flowed through the inner wall port 22 fills up the inner chamber 21 and is extruded from the continuous and uninterrupted exit port 26. Dough is continuously extruded from this exit port. This dough is extruded around the bare frankfurter. The dough from the outer chamber extrusion port 25 is extruded around the inner layer of dough encasing the frankfurter.

The dough is continuously extruded from the extrusion head whether or not there is a frankfurter there. Therefore, the dough between the frankfurter must be severed in order to make separate bagel dogs. This is accomplished by the conveyor belt 10, sensing roller 11 and downstream knife 12 portion. (See FIG. 1.)

Dough extruded from the extrusion head moves onto the conveyor belt 10. As a dough covered frankfurter moves along the conveyor belt it will push up the roller. The stationary roller rolls along the top of the dough covered frankfurter. When the tail end of the frankfurter passes beneath the roller, the roller moves closer to the conveyor belt because there is no frankfurter to support the roller. When the roller moves down, it actuates the downstream knife which severs the dough between frankfurters. The sensing roller is separated from the knife by a spatial interval equal to about the length of one dough encased frankfurter. The now individual dough encased frankfurter continues down the conveyor belt where it is removed.

What is claimed is:

1. Apparatus for extruding dough about elongate food articles comprising:
   an extruding means having means defining a central passage for serially receiving said elongate articles;
   means for sequentially dispensing elongate food articles to said central passage;
   means for propelling said articles into said central passage, said propelling means including an endless belt conveyor, means positioned for engaging each one of said elongate articles and means for conveyor said elongate articles into said passage;
   means for supplying dough to said extruding means, said extruding means further including a continuous annular extruding port concentric about said central passage and in communication with said dough supplying means;
   means for sequentially commencing said dough to cover said elongate articles with extruded dough;
   means for sensing position of said elongate articles; and
   means for severing said extruded dough about said elongate articles in response to said sensing means.

2. Apparatus for extruding dough about elongated food articles comprising:
   an extruding head, said extruding head including a central passage for receiving and passing elongated food articles, a first dough receiving opening having a first dough extruding exit and a second dough receiving opening having a second dough extruding exit with said dough extruding exits being continuous and uninterrupted annular ports formed immediately concentric one about another and together concentric about said central passage to extrude dough layers overlying one another, said extruding head further including means to communicate with dough supplying means for dispersing dough from said dough extruding exits to form longitudinal seams at diametrically different positions to inhibit seam splitting of dough extruded about food articles directed through said central passage.

3. Apparatus for extruding dough about elongate food articles comprising in combination: a magazine for containing in a sequential relationship elongate food articles; means communicating with said magazine for dispensing elongate food articles serially to a trough; a trough for serially guiding said elongate food articles; means adjacent said trough having a dough receiving opening and a dough extruding exit for extruding dough, said extruding exit forming a continuous and uninterrupted passageway concentrically about said elongate food articles as they are directed through said extruding means; spacing and propelling means associated with said trough for propelling said articles through said trough and into said dough extruding means; and a conveyor for receiving dough-encased elongate food articles from said extruding means, said conveyor means including means for propelling said as food articles.

4. The invention of claim 3 and including means attached to said conveyor for sequentially severing dough between successive elongate food articles.

5. The invention of claim 4 and including elongate food articles detecting means operatively communicated to said severing means to actuate said severing means between the passage of dough encased elongate food articles.

* * * * *